United States Patent [19]

Hanzawa et al.

[11] Patent Number: 5,026,671

[45] Date of Patent: Jun. 25, 1991

[54] SINTERED SILICON NITRIDE AND METHOD FOR MAKING THE SAME

[75] Inventors: Shigeru Hanzawa, Kagamihara; Hiroto Matsuda, Nagoya; Kouzi Fusimi, Gifu, all of Japan

[73] Assignee: NGK Insulators, Ltd., Nagoya, Japan

[21] Appl. No.: 493,162

[22] Filed: Mar. 14, 1990

[30] Foreign Application Priority Data

Mar. 17, 1989 [JP] Japan .................. 1-66625

[51] Int. Cl.⁵ .................. C04B 35/52; C04B 35/58; C04B 35/02; C04B 35/08
[52] U.S. Cl. .................. 501/96; 501/87; 501/88; 501/92; 501/95; 501/97; 501/98
[58] Field of Search .................. 501/92, 95, 96, 97, 501/98, 87, 88

[56] References Cited

U.S. PATENT DOCUMENTS 4,073,845 2/1978 Buljan et al. .
4,225,356 9/1980 Prochazka et al. .................. 106/73.5
4,365,022 12/1982 Tabata et al. .................. 501/97

FOREIGN PATENT DOCUMENTS 0276334 8/1988 European Pat. Off. .
21254 1/1988 Japan .

OTHER PUBLICATIONS

World Patent Index No. 88-067519 dated Oct. 1988.
European Search Report.

*Primary Examiner*—William R. Dixon, Jr.
*Assistant Examiner*—Michael Marcheschi
*Attorney, Agent, or Firm*—Armstrong, Nikaido, Marmelstein, Kubovcik & Murray

[57] ABSTRACT

A sintered silicon nitride contains at least 90% of $\beta$-type silicon nitride, wherein said $\beta$-type silicon nitride consists essentially of 35 to 80% of large crystal particles with the remainder of small crystal particles, said large crystal particles having a mean particle length being at least two times as long as that of said small crystal particles. This sintered silicon nitride is obtained by a method wherein one batch of starting silicon nitride powders, whose primary particles have a mean particle size of 0.1 to 0.5 $\mu$m, and another batch of starting silicon nitride powders, whose primary particles have a mean particle size of 0.5 to 0.7 $\mu$m, are blended with a sintering aid or aids at a given weight ratio, and the thus obtained blend is formed or compacted and sintered.

2 Claims, 1 Drawing Sheet

SINTERED SILICON NITRIDE AND METHOD FOR MAKING THE SAME

BACKGROUND OF THE INVENTION

1. Field of the Invention

The present invention relates to a sintered silicon nitride having high strength and toughness, which is applicable to parts required to possess heat resistance, corrosion resistance, wear resistance, etc. such as, for instance, engine or sliding parts.

2. Prior Art

Silicon nitride ($Si_3N_4$) broken down into one of high-temperature structural ceramic materials is one of attractive ceramic materials that have sufficient strength, are chemically stable and resistant to thermal impact at high temperatures.

Japanese Patent Kokai Publication No. 21254/1988 discloses one typical method for making such silicon nitride ceramics with the use of a mixture of silicon nitride powders having a relatively large particle size with those having a relatively small particle size as a raw powdery material, wherein a sintering aid is previously added to the silicon nitride powders having a larger particle size, which are then mixed with the silicon nitride powders having a smaller particle size to obtain a mixture, and that mixture is compacted and sintered.

Such a conventional method for making sintered silicon nitride takes aim at obtaining uniform sintered pieces by improving the formability of a raw powdery material by the incorporation of silicon nitride powders differing in particle size, thereby increasing the compact's density.

However, although the sintered pieces obtained by this method has relatively high mechanical strength, their bending strength and toughness are still far from satisfactory.

Following the invention set forth in the above Kokai publication, we have made intensive and extensive studies of making sintered silicon nitride with starting materials having varied particle sizes, and have now found that the bending strength, toughness, etc. of sintered silicon nitride has a close relationship to the proportion, particle size and particle-size distribution of $\beta$-type silicon nitride.

Such findings underlie the present invention.

A main object of the present invention is to provide a high-density sintered silicon nitride excelling in such mechanical properties such as bending strength and fracture toughness.

SUMMARY OF THE INVENTION

According to one aspect of the present invention, the above object is achieved by the provision of a sintered silicon nitride containing at least 90% of $\beta$-type silicon nitride, wherein said $\beta$-type silicon nitride consists essentially of being 35 to 80% of large crystal particles with the remainder of small crystal particles, said large crystal particles having a mean particle length, to be defined later, at least twice as long as that of said small crystal particles.

According to another aspect of the present invention, there is provided a sintered silicon nitride wherein the mean particle length of said large crystal particles is in a range of 5.0 to 14 $\mu$m.

According to a further aspect of the present invention, there is provided a sintered silicon nitride, wherein the mean particle length of said small crystal particles is in a range of 0.5 to 5 $\mu$m.

According to a still further aspect of the present invention, there is provided a method for making a sintered silicon nitride according to the first aspect of the present invention, wherein one batch of starting silicon nitride powders, whose primary particles have a mean particle size of 0.1 to 0.5 $\mu$m, and another batch of starting silicon nitride powders, whose primary particles have a mean particle size of 0.5 to 0.7 $\mu$m, are blended with a sintering aid or aids at a given weight ratio, and the thus obtained blend is formed or compacted and sintered.

BRIEF DESCRIPTION OF THE DRAWINGS

The present invention will now be explained specifically but not exclusively with reference to the accompanying drawing, in which.

DETAILED EXPLANATION OF THE INVENTION

Figure 1:
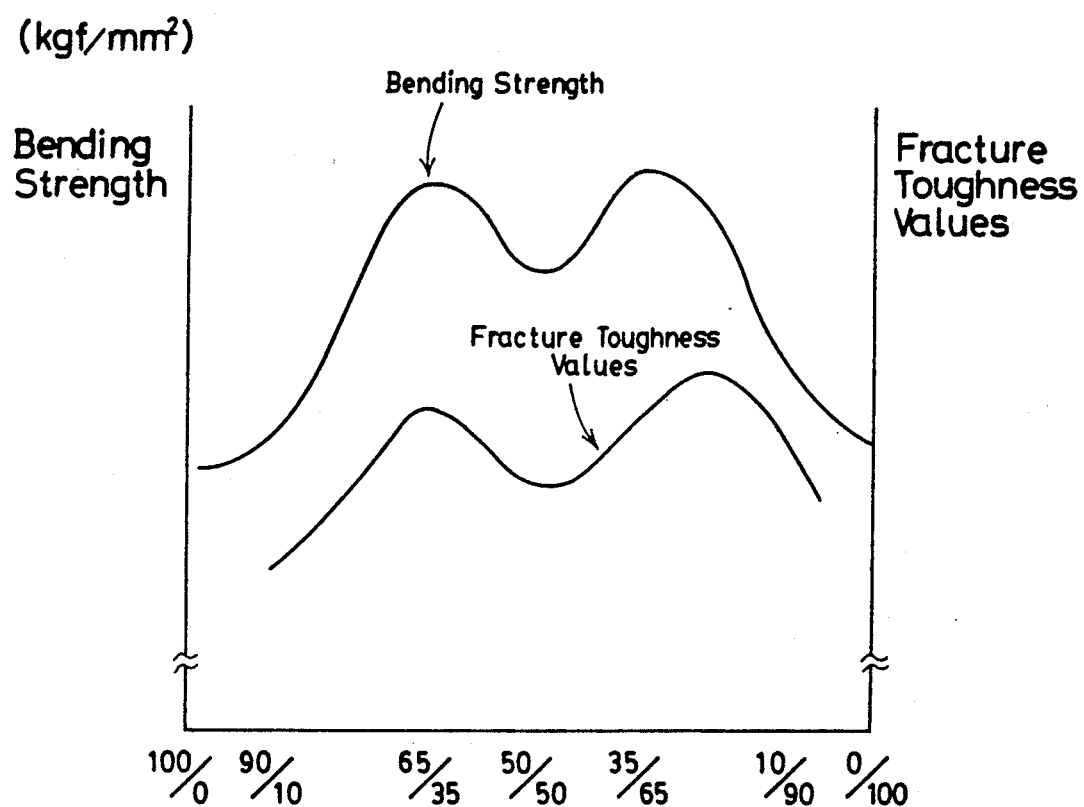
FIG. 1 is a schematic view illustrating correlations between the proportion of the small and large particles in the $\beta$ phase of a sintered silicon nitride piece, bending strength and fracture toughness.

In the present disclosure, the "amount in %" of $\alpha$-type silicon nitride or $\beta$-type silicon nitride refers to the ratio of the height value of the line of diffraction of $\alpha$-$Si_3N_4$ or $\beta$-$Si_3N_4$ to the sum of the height values of the line of diffraction thereof, as measured by X-ray diffraction.

Further, the "particle length" of $\beta$-type crystal particles refers to the planar length of the long side of each columnar or acicular particle of a $\beta$-type crystal having an aspect ratio of at least 3 as determined on the surface of a plane-polished sintered piece under an optical or scanning type of electron microscope, when said sintered piece is etched with an aqueous solution of hydrofluoric acid.

Still further, the "mean particle length" refers to the length corresponding to each apex of two distribution curves obtained by the connection of points plotted with the particle lengths of at least 100, preferably 500 or more $\beta$-type crystal particles, as measured at 0.5 $\mu$m or 1.0 $\mu$m unit, as abscissa and the number of such particles as ordinate.

Still further, the proportion of the large particles is defined as the ratio found by dividing the number of particles on the distribution curve for the large particles of the above distribution curves by the number of all particles. If the distribution curve for the small particles overlaps partly the distribution curve for the large particles, then the number of particles may be found by calculation, assuming the normal distribution curves hold.

In the sintered silicon nitride according to the present invention, the proportion of $\alpha$-type silicon nitride is limited to below 10%, whereas the proportion of $\beta$-type silicon nitride is restricted to 90% or higher. This is because the $\alpha$ to $\beta$ phase transformation occurs at the time of sintering so that the sintered silicon nitride can be much more densified and intensified, and the higher the proportion of $\beta$-type silicon nitride, the higher the density and strength of the sintered silicon nitride.

It is possible to obtain sintered silicon nitride much more improved in terms of such mechanical properties as bending strength and fracture toughness by regulating the proportion of the large β-type silicon nitride particles to 35 to 80% and making the mean particle length of the large crystal particles at least two times as long as that of the small crystal particles.

In what follows, the present invention will be explained, by way of example, with reference to the following examples.

EXAMPLES

A batch (1) of silicon nitride powders, whose primary particles have a mean particle size of 0.1 to 0.5 μm is blended with a batch (2) of silicon nitride powders, whose primary particles have a mean particle size of 0.5 to 0.7 μm. It is desired that the batches (1) and (2) have a virtually identical purity, or the batch (2) has a higher purity.

Table 1 set forth the purity, mean particle size and blending ratio of the batches (1) and (2).

One hundred (100) parts by weight of the batches (1) and (2) were wet-mixed with 5 parts by weight of MgO, 2 parts by weight of SrO and 3 parts by weight of $CeO_2$, each acting as a sintering aid, and water for 6 hours in a stirring type of mixer filled therein with $Si_3N_4$ balls, each of 5 mm in outer diameter, thereby preparing a slurry. The slurry was granulated to spherical particles having a mean particle size of 60 μm by spray-drying. The thus granulated powders were then press-formed in a mold of 60 mm in diameter and 60 mm in height. Finally, the compact was heated to 1700° C. or higher in a $N_2$ gas atmosphere at a pressure of 1 atm for 1 to 2-hour sintering, thereby obtaining a sintered piece. The sintering conditions, i.e., sintering temperatures and pressures are set forth in Table 1.

The bending strength and fracture toughness of the obtained sintered pieces were measured by four-point bending testing according to JIS-R1601.

In addition, the sintered pieces were polished to a mirror to measure the intensities of line of diffraction of $\alpha$-$Si_3N_4$ and $\beta$-$Si_3N_4$. Then, the amount in % of the $\beta$-$Si_3N_4$ was found by the following equation:

$$\frac{I\beta_{(101)} + I\beta_{(210)}}{I\alpha_{(102)} + I\alpha_{(210)} + I\beta_{(101)} + I\beta_{(210)}} \times 100\%$$

wherein:
$I\alpha_{(102)}$ = Intensity of line of diffraction of $\alpha$-$Si_3N_{4(102)}$;
$I\alpha_{(210)}$ = Intensity of line of diffraction of $\alpha$-$Si_3N_{4(210)}$;
$I\beta_{(101)}$ = Intensity of line of diffraction of $\beta$-$Si_3N_{4(101)}$; and
$I\beta_{(210)}$ = Intensity of line of diffraction of $\beta$-$Si_3N_{4(210)}$ Then, the polished test pieces were etched with a 46 vol. % solution of HF, and were photographed at any five regions at 1000 x. The photographs were processed with an image processor IBAS 2000 (made by Zeiss) to measure the sizes of crystal particles having an aspect ratio of 3 or higher at 0.5 μm unit. The resulting data were plotted on a section paper to find the mean particle length and the proportion of the large and small particles. The results are set forth in Table 1.

TABLE 1

|  | Amount of impurities in Batch (1) (wt %) | Mean particle size of Batch (1) (μm) | Amount of impurities in Batch (2) (wt %) | Mean particle size of Batch (2) (μm) | Blending proportion (1)/(2) | Sintering Conditions Temperature (°C.) | Time (Hr) |
|---|---|---|---|---|---|---|---|
| Example 1 | <0.05 | 0.2 | <0.05 | 0.5 | 50/50 | 1750 | 2 |
| Example 2 | <0.05 | 0.2 | <0.05 | 0.5 | 35/65 | 1780 | 2 |
| Example 3 | <0.05 | 0.5 | <0.05 | 0.7 | 20/80 | 1780 | 2 |
| Example 4 | <0.05 | 0.2 | <0.05 | 0.7 | 35/65 | 1750 | 2 |
| Example 5 | <0.05 | 0.1 | <0.05 | 0.5 | 65/35 | 1750 | 2 |
| Example 6 | <0.05 | 0.3 | <0.05 | 0.6 | 50/50 | 1750 | 2 |
| Comparative Example 1 | <0.05 | 0.2 | <0.05 | 0.5 | 90/10 | 1750 | 1 |
| Comparative Example 2 | <0.05 | 0.2 | 0.3 | 0.5 | 35/65 | 1730 | 2 |
| Comparative Example 3 | <0.05 | 0.2 | — | — | 100/0 | 1750 | 2 |
| Comparative Example 4 | <0.05 | 0.2 | <0.05 | 0.7 | 10/90 | 1780 | 2 |

|  | Bending strength (kgf/mm²) | Fracture toughness $K_{IC}$ (MN/m$^{3/2}$) | Mean particle length of large particles (μm) | Mean particle length of small particles (μm) | Proportion of small and large particles in sintered pieces | β crystal phase (%) |
|---|---|---|---|---|---|---|
| Example 1 | 120 | 7.5 | 10 | 3.0 | 50/50 | 97 |
| Example 2 | 140 | 8.3 | 12 | 3.5 | 35/65 | 99 |
| Example 3 | 130 | 8.3 | 12 | 4.0 | 20/80 | 100 |
| Example 4 | 125 | 7.7 | 8 | 1.5 | 35/65 | 98 |
| Example 5 | 135 | 8.0 | 10 | 1.0 | 65/35 | 90 |
| Example 6 | 123 | 8.0 | 9 | 4.5 | 50/50 | 99 |
| Comparative Example 1 | 90 | 6.8 | 5 | 1.5 | 90/10 | 98 |
| Comparative Example 2 | 80 | 7.0 | 5 | 1.0 | 20/80 | 90 |
| Comparative Example 3 | 95 | 6.7 | 0 | 2.0 | 100/0 | 85 |
| Comparative Example 4 | 98 | — | 10 | 4.0 | 10/90 | 92 |

As will be understood from Table 1, Examples 1 to 6 according to the present invention are improved over Comparative Examples 1 to 4 in terms of bending strength and fracture toughness.

Referring to the amount of the $\beta$ crystal phase in the sintered pieces, the proportion of the large and small particles in the $\beta$ crystal phase and the mean particle length of each of the large and small particles, it is found that in Examples 1 to 6, the $\beta$ phases account for 90% or more of the sintered pieces and the proportions of the small and large particles in the $\beta$ phases are in a range of 35 to 80%. As illustrated in FIG. 1, there is a certain correlation between bending strength and the proportion of the small and large particles in the $\beta$ phase of the sintered piece. In terms of fracture toughness, there is again a certain correlation between it and the proportion of the small and large particles in the $\beta$ phase of the sintered piece.

It is noted in Table 1 that the proportion of the small and large particles in the sintered pieces departs from the range set forth in Examples 1-6. It is considered that decreases in the bending strength and fracture toughness of Comparative Example 2 are due to a large amount of impurities being present in the batch (2), and the bending strength and fracture toughness of Comparative Example 3 are both less than satisfactory because of using only the batch (1) of small particles.

According to the present invention as explained above, it is possible to obtain sintered silicon nitride improved in terms of such mechanical properties as bending strength and toughness by regulating the amount of the $\beta$ phase therein to 90% or more and the proportion of the large particles in the $\beta$ phase to 35 to 80% and making the mean particle length of the large particles at least two times as long as that of the small particles.

What is claimed is:

1. A sintered silicon nitride comprising at least 90% of $\beta$-type silicon nitride, said $\beta$-type silicon nitride consisting essentially of 35 to 80% of large crystal particles having a mean particle length of 5.0 to 14 $\mu$m with the remainder being small crystal particles having a mean particle length of 0.5 to 5 $\mu$m, wherein the large and small crystal particles have an aspect ratio of at least 3 and the mean particle length of the large crystal particles is at least twice the mean particle length of the small crystal particles.

2. A method for making a sintered silicon nitride as recited in claim 1, comprising blending a batch of silicon nitride powder A in which the primary particles have a mean particle size of 0.1 to 0.5 $\mu$m and a batch of silicon nitride powder B in which the primary particles have a mean particle size of 0.5 to 0.7 $\mu$m, the weight ratio of B/A being in the range of 35/65 to 80/20, with a sintering aid, forming or compacting the blend and then sintering the blend so as to obtain the sintered silicon nitride.

* * * * *

UNITED STATES PATENT AND TRADEMARK OFFICE
CERTIFICATE OF CORRECTION

PATENT NO. : 5,026,671
DATED : June 25, 1991
INVENTOR(S) : Shigeru HANZAWA et al It is certified that error appears in the above-identified patent and that said Letters Patent is hereby corrected as shown below:

On the cover page, Item [30], the following should be added:

-- Mar. 2, 1990 [JP]    Japan    . . . . . . .    2-52178 --

Signed and Sealed this

Twenty-ninth Day of December, 1992

*Attest:*

DOUGLAS B. COMER

*Attesting Officer*    *Acting Commissioner of Patents and Trademarks*